Figure 1:
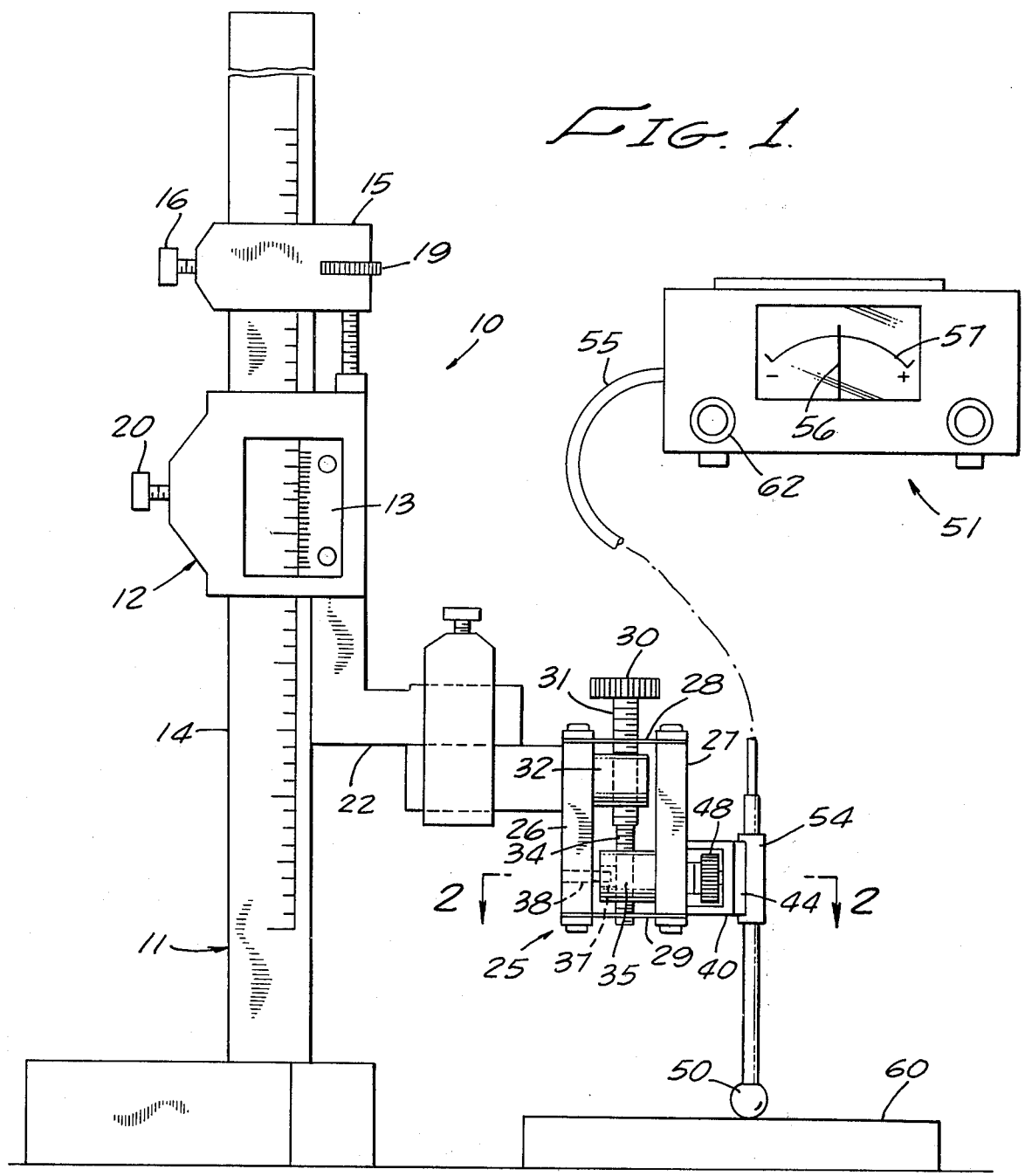

United States Patent [19]

Marcyan

[11] 4,432,141
[45] Feb. 21, 1984

[54] HIGH PRECISION HEIGHT COMPARATOR APPARATUS

[76] Inventor: Stanley T. Marcyan, 515 W. Windsor Rd., Glendale, Calif. 91204

[21] Appl. No.: 500,937

[22] Filed: Jun. 3, 1983

[51] Int. Cl.³ .............................................. G01B 7/14
[52] U.S. Cl. ................................ 33/169 R; 33/172 E; 33/149 J
[58] Field of Search ................ 33/169 R, 172 E, 170, 33/171, 149 J, 143 L, 148 H, 174 L, 172 B, 173

[56] References Cited

U.S. PATENT DOCUMENTS

| | | | |
|---|---|---|---|
| 2,627,119 | 2/1953 | Graham | 33/172 E |
| 3,281,944 | 11/1966 | Youngblood | 33/148 H |
| 3,482,323 | 12/1969 | Hamel et al. | 33/172 E |
| 3,946,492 | 3/1976 | DuBose, Jr. | 33/169 R |
| 4,182,044 | 4/1980 | Peonski | 33/174 L |

FOREIGN PATENT DOCUMENTS 2705787 8/1977 Fed. Rep. of Germany .... 33/169 R

*Primary Examiner*—Willis Little
*Attorney, Agent, or Firm*—Sellers and Brace

[57] ABSTRACT

A high precision height comparator and surface gauging apparatus utilizing a novel micro-adjuster securable to the carriage of a transfer stand and having a clamp for securing a test indicator thereto. The micro-adjuster is a self-contained unit clampable to the carriage of a transfer stand and is provided with a high resolution differential screw. A simple rugged clamp mounted on the micro-adjuster accommodates any suitable test indicator of either the electronic or mechanical type. When used with an electronic indicator, comparative measurements are routinely made to an accuracy of a few millionths of an inch.

9 Claims, 2 Drawing Figures

HIGH PRECISION HEIGHT COMPARATOR APPARATUS

This invention relates to height comparator apparatus, and more particularly to an improved comparator device having a simple, unique micro-adjuster interposed between the carriage of a height transfer stand and a height sensor.

BACKGROUND OF THE INVENTION

Height comparators have been provided heretofore in a variety of designs useful in comparing the height of a specimen with the height of an equivalent number of precision machinist blocks such as Johannson blocks. Such equipment customarily makes use of a transfer stand adjustably supporting a carriage to which is secured a suitable height sensor, such as a dial indicator, and electronic indicator or the like means. Examples of such prior comparators are found in U.S. Pat. Nos. to Cady 1,459,500; Lester 1,949,280; Conover 2,081,738; Temple 2,083,759; Aller et al 2,370,220; Graham 2,717,449; Huyser 3,040,445 and Perlotto 4,251,922.

These and the like prior teachings are subject to numerous deficiencies and shortcomings avoided by this invention. Although some of these prior proposals embrace provision for making both a coarse and a fine adjustment of the indicator carried by the transfer stand, they lack any provision for further and more highly precise adjustment for the indicator probe. Additionally prior constructions are complex and involve a number of moving parts inherently incorporating loss motion or backlash. Another shortcoming is the lack of a micro-adjuster interconnecting the height sensor and the transfer stand carriage. More particularly, the prior art surface gauges utilizing transfer stand equipment are incapable of adjustment to accuracies of a few millionths of an inch.

SUMMARY OF THE INVENTION

This invention avoids the foregoing and other shortcomings and disadvantages of prior high precision height gauges. For this purpose the invention utilizes the rugged transfer stand having a carriage incorporating a vernier. Interposed between this carriage and the indicator probe is a micro-adjuster of simple rugged construction devoid of loss motion and backlash and utilizing a precision high resolution differential screw to make highly precise changes in the position of the indicator or its probe. The micro-adjuster is a self-contained compact unit having a pair of rigid parallel members interconnected between their opposite ends by respective leaf springs and wherein the differential screw is effective to vary the positions of the rigid members relative to one another. The indicator sensor is rigidly clamped to the micro-adjuster by a single clamping screw. Various types of known indicators may be clamped to the micro-adjuster including dial indicators, electronic indicators or the like. The vernier-equipped carriage of the transfer stand is employed to bring the indicator sensor in close proximity to a calibrated block, such as a Johannson block, whereupon the differential screw can be manipulated until the indicator scale represents the fractional height of the calibrated block.

The test specimen is placed beneath the sensor and is manipulated to contact the specimen surface with the indicator probe and the indicator reading then displayed is compared with the reading obtained with the standard block. If an electronic gauge is connected to the sensor probe the control of the electronic gauge can be manipulated to obtain an ultra precise reading to an accuracy of a few millionths of an inch.

Accordingly, it is a primary object of this invention to provide a simply constructed micro-adjuster interposable between a height sensor and a transfer stand providing very fine adjustments free of backlash or loss motion.

Another object of the invention is the provision of a simple self-contained rugged micro-adjuster firmly clampable to the carriage of a transfer stand and having provision for clamping a precision height sensor thereto.

Another object of the invention is the provision of a simple ruggedly constructed comparator support having a minimum number of parts and operable to make ultra precise height adjustments.

These and other more specific objects will appear upon reading the following specification and claims and upon considering in connection therewith the attached drawing to which they relate.

Figure 2:
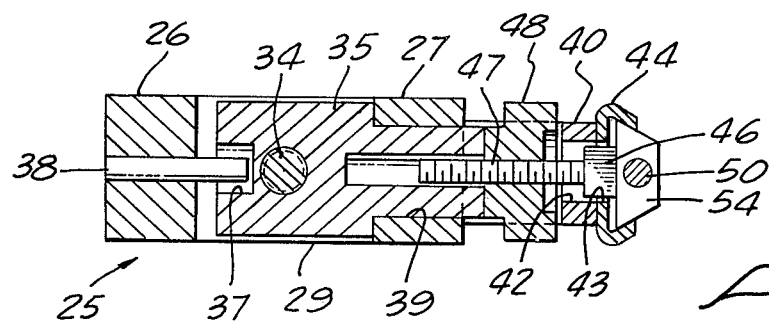

Referring now to the drawings in which a preferred embodiment of the invention is illustrated:

FIG. 1 is an elevational view of an illustrated embodiment of the invention in use with an electronic indicator; and FIG. 2 is a cross sectional view on an enlarged scale taken along line 2—2 on FIG. 1.

The ultra precision comparator apparatus, designated generally 10, employs a transfer stand 11 of any suitable type in which the carriage 12 incorporates a vernier scale 13 usable in a manner well known to persons skilled in the comparator art to set the carriage to a precise position along the standard 14 of stand 11. Carriage 12 includes an anchor member 15 clampable to standard 14 by a thumb screw 16. Anchor 15 is connected to the movable adjustable member 18 of the carriage by the adjusting screw 19. The adjustable carriage member 18 is clampable in a desired final position by thumb screw 20.

Rigidly supported on the lower end of carriage member 18 is an L-shaped bracket 22 well known to persons skilled in this art and heretofore used to support a dial indicator or other height sensing probe. According to this invention, however, the horizontal arm of bracket 22 is being utilized to clamp the unitary micro-adjuster designated 25 to bracket 22.

The micro-adjuster has a main body in the form of a parallelogram including a pair of parallel rigid members 26, 27 rigidly clamped together between their opposite ends by a pair of identical leaf springs 28, 29. A high precision differential screw 30 has its axis supported between and parallel to members 26 and 27 and includes a set of precision coarse threads 31 mating with threads on a boss 32 fixed to member 26. The lower end of the differential screw has high precision slightly finer threads 34 mating with the threads of a boss 35 fixed to rigid member 27. It will be understood that the midportion of springs 28 and 29 are provided with openings loosely accommodating the differential screw. Boss 35 is provided with a well 37 the diametrically opposed sidewalls of which are engageable with a stop pin 38 anchored in member 26 to limit the adjustment of the micro-adjuster.

Member 27 of the micro-adjuster 25 is provided with a simple backlash free clamp for clamping thereto a test indicator or the probe of a electronic indicator. This sensor clamping device is best shown in FIG. 2 wherein the boss 35 at the lower end of the differential screw is shown as extending through a bore 39 in member 27 to which it is firmly anchored as by silver solder or the like. Straddling the outer end of this boss is a U-shaped bracket 40 having the ends of its legs soldered or otherwise firmly secured to member 27. The bight portion of bracket 40 is provided with a bore 42 in registry with a non-circular bore 43 in the bottom of a channel shaped clamping member 44 having its sidewalls converging toward one another in a manner clearly shown in FIG. 2. The threaded shank 47 of the clamping screw has a non-circular head 46 extending loosely through the non-circular bore 43 and its threaded shank 47 mates with the threads of a knurled thumb nut 48.

As herein shown by way of illustration, the micro-adjuster 25 is shown supporting the sensor probe 50 of an electronic gauge 51. The shank of sensor 50 is firmly anchored to a trapezoidal shaped member 54 having its converging sidewalls lying at the same angle as the inner surfaces of the sidewalls of channel member 44. If the thumb nut 48 is rotated in one direction the head 46 of the clamping screw is movable to the left leaving the interior of the channel member unobstructed and allowing the mounting member 54 of the sensor to be inserted therealong. While the sensor is held in this position, thumb nut 48 is rotated in the opposite direction forcing the head of screw 46 to the right against the adjacent backwall of mounting member 54 thereby firmly clamping its tapering walls against the converging sidewalls of the channel member. When so clamped, the axis of the sensor lies precisely parallel to members 26 and 27.

The sensor 50 is connected in known manner by a flexible cable 55 to the electronic gauge 51 having its pointer or pivoting needle 56 movable over an arcuate graduated scale 57 having a zero position midway between its opposite ends.

In use, the comparator apparatus 10 is assembled as shown in FIG. 1 and the carriage 12 of the transfer stand is adjusted lengthwise of its stand 14 to support the sensor 50 substantially above the upper surface of a Johannson block 60. The anchor member 15 of the carriage is then clamped firmly in position, thumb nut 20 is loosened and screw 19 is adjusted to move the adjustable carriage member 18 to lower sensor 50 into closely spaced relation to the upper surface of block 60. The differential screw 30 of the micro-adjuster 25 is then manipulated to lower the sensor into contact with the upper surface of block 60 whereupon the knob 62 of meter 51 is adjusted until the meter needle 56 is in the zero or null vertical position.

The Johannson block is now replaced by the specimen undergoing inspection for compliance with specifications. If it is out of specification the meter needle will move to the right or the left from its null position and provide a direct reading of the magnitude of the variation.

Although the present drawings and description illustrate the sensor or probe of an electronic meter supported by the micro-adjuster 25, it will be understood that any other standard type of test indicator may be substituted for sensor 50 as for example a dial indicator or other precision measuring instrument having a probe positioned to be actuated by contact with a standard test block and with a test specimen.

While the particular high precision height comparator apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A self-contained unitary micro-adjuster for supporting a precision height sensor while in use to compare the height of a specimen surface with the height of a Johannson block, or the like, and comprising in combination:

first and second elongated rigid members held flexibly interconnected in spaced apart parallel relation by a pair of parallel leaf springs secured to a respective pair of ends of said rigid members;

said first rigid member having a rigid support extending therefrom and adapted to be clamped immovably to the adjustable carriage of a transfer stand;

said second rigid member having means for rigidly clamping a height sensor thereto; and manually adjustable differential screw means supported between and parallel to said first and second members with the threads at the opposite ends thereof mateable with threaded bores through means rigidly fixed to a respective one of said first and second members.

2. A unitary micro-adjuster as defined in claim 1 characterized in the provision of lost motion means constructed and arranged to limit the movement of said first and second members relative to one another to a predetermined distance lying parallel to the axis of said differential screw means.

3. A unitary micro-adjuster as defined in claim 1 characterized in that said height sensor clamping means comprises an open ended channel member fixed to said second member and having the sidewalls thereof converging toward one another, the bottom of said channel member having a non-circular opening loosely seating the non-circular head of a screw having a threaded shank, and a thumb nut on said shank operable when rotated in one direction to force the non-circular head thereof outwardly between said converging sidewalls and thereby adapted and effective to clamp the mounting member of a height sensor immovably against said channel member sidewalls.

4. A unitary micro-adjuster as defined in claim 3 characterized in that said height sensor comprises an electrical probe connected to a differential electronic gauge having a manually adjustable readout meter operable to distinguish the magnitude and polarity of a surface deviation from a precise specification.

5. A unitary micro-adjuster as defined in claim 4 characterized in that said height sensor includes a support shank connected rigidly to a support member sized and constructed to have a close sliding fit lengthwise of said channel member when the clamping screw thereof is in a retracted position to leave the interior of said channel member substantially unobstructed.

6. A unitary micro-adjuster as defined in claim 1 in combination with a transfer stand having a base supporting an upright graduated standard slidably supporting a carriage provided with clamping means for anchoring said carriage at a desired height therealong, and said carriage having means extending laterally therefrom and provided with means for rigidly clamping thereto said rigid support of said micro-adjuster.

7. A unitary micro-adjuster as defined in claim 6 characterized in that said carriage is formed in two adjustably interconnected parts each equipped with separate means for clamping the same to said upright standard, and one of said carriage parts equipped with vernier scale means in juxtaposition to the graduations on said standard.

8. That improvement in high precision comparator apparatus for comparing the height of a specimen with the height of precision blocks and utilizing a transfer stand equipped with a carriage adjustably supporting a height sensor which improvement is characterized by the provision of a micro-adjuster interposed between said carriage and said height sensor which micro-adjuster comprises:

first and second rigid members held flexibly interconnected in spaced apart parallel relation by a pair of parallel leaf springs secured to a respective pair of ends of said rigid members;

means for rigidly clamping said first rigid member to said carriage;

means for rigidly clamping said height sensor to said second rigid member; and means including differential screw means interconnecting said first and second rigid members with axis parallel to said rigid members and operable to shift said rigid members selectively in opposite directions while maintained continuously parallel by said pair of leaf springs.

9. That improvement in comparator apparatus as defined in claim 8 characterized in that said height sensor clamping means comprises:

a channel shaped member secured to said second rigid member having the sidewalls thereof converging toward one another at an acute angle, a screw having a non-circular head seated loosely in a non-circular opening in the bottom of said channel shaped member, a thumb nut on said screw operable when rotated in one dirction to force the head of said screw outwardly between said converging sidewalls of said channel shaped member and thereby effective to clamp the support member of said height sensor immovably against the inner surfaces of said converging sidewalls.

* * * * *